(12) United States Patent
Riefler et al.

(10) Patent No.: US 9,728,760 B2
(45) Date of Patent: Aug. 8, 2017

(54) BATTERY SYSTEM AND SPACER FOR CREATING A PHYSICAL DISTANCE WITHIN THE BATTERY SYSTEM

(71) Applicant: Robert Bosch GmbH, Stuttgart (DE)

(72) Inventors: Michael Riefler, Reutlingen (DE); Thomas Klemen, Ilsfeld/ Auenstein (DE); Ionut Marian Lica, Schwieberdingen (DE); Seyed Mohammad Seyed Abbassi, Pforzheim (DE); Christian Zielke, Eningen Unter Achalm (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 14/799,964

(22) Filed: Jul. 15, 2015

(65) Prior Publication Data

US 2016/0020450 A1    Jan. 21, 2016

(30) Foreign Application Priority Data

Jul. 15, 2014   (DE) .......................... 10 2014 213 700

(51) Int. Cl.
| | |
|---|---|
| *H01M 2/14* | (2006.01) |
| *H01M 2/18* | (2006.01) |
| *H01M 2/10* | (2006.01) |
| *H01M 2/12* | (2006.01) |
| *H01M 10/0525* | (2010.01) |

(52) U.S. Cl.
CPC ........... *H01M 2/18* (2013.01); *H01M 2/1016* (2013.01); *H01M 2/14* (2013.01); *H01M 2/1241* (2013.01); *H01M 10/0525* (2013.01)

(58) Field of Classification Search
CPC .... H01M 2/18; H01M 2/0277; H01M 2/0486; H01M 2/1077; H01M 2/1094; H01M 2/24; H01M 2/34
See application file for complete search history.

(56) References Cited

U.S. PATENT DOCUMENTS

2011/0064972 A1*   3/2011   Park .................... H01M 2/0408
                                                                429/7

* cited by examiner

*Primary Examiner* — Patrick Ryan
*Assistant Examiner* — Ben Lewis
(74) *Attorney, Agent, or Firm* — Michael Best & Friedrich LLP

(57) ABSTRACT

A battery system (BS), containing at least one battery device (BV) and at least one operating device (BTV) for operation of the battery system (BS) and/or of the at least one battery device (BV), and at least one further device (V), wherein the at least one further device (V) is intended to create a physical distance between two component parts of the battery system (BS) and in particular between the at least one battery device (BV) and a further component (K) of the battery system (BS), or between at least two component parts of the at least one battery device (BV), wherein the at least one operating device (BTV) is arranged at least partially within the at least one further device (V).

20 Claims, 2 Drawing Sheets

BATTERY SYSTEM AND SPACER FOR CREATING A PHYSICAL DISTANCE WITHIN THE BATTERY SYSTEM

BACKGROUND OF THE INVENTION

The present invention relates to a spacer and a battery system and also to the use thereof.

Battery systems are known from the prior art, for example US20111064972A, wherein operating devices, which are intended for operation of the battery system, are arranged within the battery systems.

The invention proceeds from a battery system, in particular a lithium-ion battery system, containing at least one battery device and at least one operating device for operation of the battery system and/or of the at least one battery device, and at least one further device, wherein the at least one further device is intended to create a physical distance between two component parts of the battery system and in particular between the at least one battery device and a further component of the battery system, preferably at least one other battery device, or between at least two component parts of the at least one battery device.

A battery system is a preferably rechargeable, electrochemical energy store. The battery system contains a battery device—the actual energy store—and possibly devices for controlling the battery device and also preferably contact devices. The contact devices are suitable for transferring electrical energy from the battery system to a consumer. The battery device can be formed from a multi-stage composite of electrically interconnectable energy storage units. The smallest energy storage unit is referred to as a battery cell, and at least two battery cells can be connected to form a battery module; the battery cells can be connected in series or in parallel. At least two battery modules can be configured to form a battery pack; the battery modules can be connected in series or in parallel. Each stage of the composite of the connectable energy storage units can serve as a single energy store of the battery system and can be referred to as a battery device.

The battery system also contains, for example, safety devices such as, in particular, at least one cooling device. The at least one cooling device can be arranged on the battery device, for example on the battery pack or on the battery module or on the battery cell, or on a heat-conducting or burnable component of the battery system, and in the event of an overheating of the battery device or of the heat-conducting or burnable component will cool this again or even prevent the overheating of the battery device or of the heat-conducting or burnable component.

The cooling device may be a thermally acting means, for example a cooling fluid, or a mechanically acting device, for example a fan. The battery system also contains, for example, an actuator, wherein the actuator is suitable for example for moving the battery device. The actuator may be, for example, a mechanical ejector for ejecting a potentially defective battery device from the battery system or an opening device for opening a degassing valve of a potentially defective battery device. The battery system may also contain a fire protection device, for example an extinguishing agent cartridge or a scattering device suitable for scattering an extinguishing agent or foam. The battery system may also contain an operating device. The operating device may be, for example, an electronic or mechanical device for controlling electrical, mechanical or chemical processes within the battery system. The battery system may also contain a stabilizing device. The stabilizing device may be, for example, a strut or a framework; the stabilizing device serves in particular to provide mechanical stability for components of the battery system and prevents the undesired movement thereof. Lastly, the battery system may contain a sensor; the sensor may be a temperature sensor, a pressure sensor or a gas sensor.

SUMMARY OF THE INVENTION

The invention relates to a battery system and a spacer and also to the use of the battery system.

The core of the invention lies in the fact that the at least one operating device is arranged at least partially within the at least one further device.

The fact that the at least one operating device is arranged at least partially within the at least one further device leads to the advantage in accordance with the invention of keeping space free within the battery system. The space kept free for example leads to the advantage that substances which may develop within the battery system can be more quickly discharged. In addition, the fact that the at least one operating device is arranged at least partially within the at least one device leads to the advantage in accordance with the invention that at least one operating device can be protected against substances, for example electrolyte.

In addition, a spacer according to the invention has at least one surface that corresponds to at least one correspondence surface of at least one battery device of a battery system. Here, the battery system contains at least one operating device suitable for operating the battery system and/or the at least one battery device, and the spacer is intended to create a physical distance between the at least one battery device and a further component of the battery system, preferably at least one other battery device, or between at least two component parts of the at least one battery device, and the at least one operating device is arranged at least partially within the spacer.

The fact that the at least one operating device is arranged at least partially within the spacer leads to the advantage in accordance with the invention of keeping space free outside the spacer. In addition, the fact that the at least one operating device is arranged at least partially within the spacer leads to the advantage in accordance with the invention that the at least one operating device can be protected against substances, for example electrolyte.

In addition, the invention provides a battery device, wherein the battery device has a spacer and the battery device in particular is a battery module or a battery cell.

In accordance with the invention the battery system or the space is suitable for use in a vehicle, in particular in a motor vehicle, or in power engineering.

In accordance with an advantageous embodiment of the invention the at least one further device is a belt, in particular a press belt, or a housing of the at least one battery device or a stabilizing device, intended to provide mechanical stability for the housing of the at least one battery device and/or the battery device and/or a battery cell and/or a battery module, or is a cooling device or a fire protection device or an insulator.

In accordance with a next preferred embodiment of the invention the at least one further device is formed from an electrically insulating material, in particular from plastic, in particular from polyphenylene sulfide, or from a thermoplastic polymer or from fluorine polymer rubber or ethylene propylene diene rubber, for example Viton©, or polyamide 6 with 30% glass fibers, for example PA GF30©, or polypropylene with 30% glass fibers, for example PP GF30©.

The electrically insulating material is also in particular epoxy resin or polyurethane resin, for example UR5604©. In addition, the electrically insulating material in particular is glass, ceramic or cork. The fact that the at least one further device is formed from an electrically insulating material, in particular from plastic, leads to the advantage in accordance with the invention of making the handling of a battery system safer. The safer design is based on the prevention of undesirably occurring currents by the electrically insulating material.

In accordance with a next preferred embodiment of the invention the at least one operating device is an electronic device and/or a control device and/or a sensor and/or an actuator.

In accordance with a further advantageous embodiment of the invention the at least one battery device is a battery module or a battery cell.

In accordance with a next preferred embodiment of the invention the spacer is formed from an electrically insulating material, in particular from plastic.

In accordance with a next preferred embodiment of the invention the at least one operating device is an electronic device and/or a control device and/or a sensor and/or an actuator.

In accordance with a further advantageous embodiment of the spacer the at least one battery device is a battery module or a battery cell.

BRIEF DESCRIPTION OF THE DRAWINGS

The invention will be explained hereinafter on the basis of exemplary embodiments, from which further inventive features will emerge, but to which the scope of the invention is not limited. The exemplary embodiments are illustrated in the figures.

In the figures.

DETAILED DESCRIPTION

Figure 1:
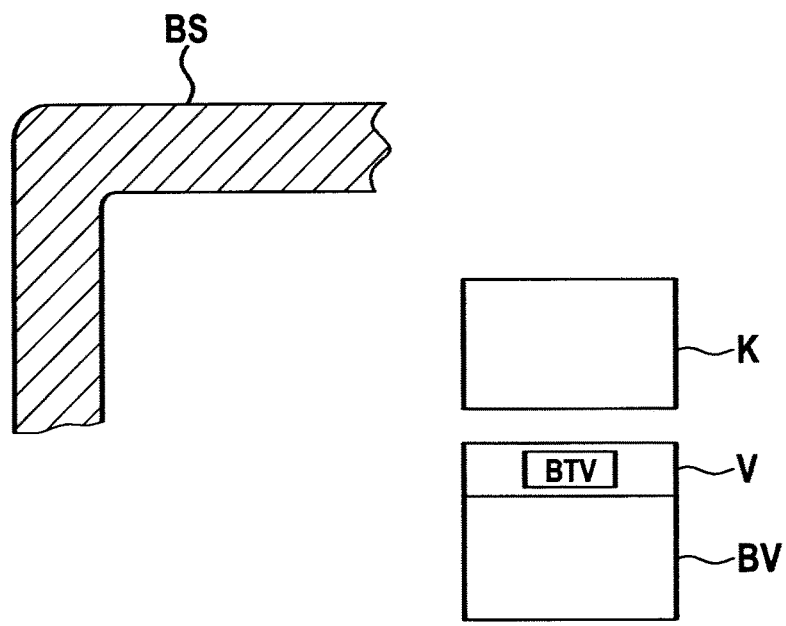
FIG. 1 shows a schematic illustration of the battery system according to the invention in accordance with a first embodiment.

In FIG. 1 the battery system according to the invention in accordance with a first embodiment is schematically illustrated. The battery system is designated by BS. The battery system BS contains at least one battery device BV. The at least one battery device BV may be, for example, a battery module or a battery cell. The battery system BS also contains at least one further device V, wherein the at least one further device V is intended to create a physical distance between the at least one battery device BV and a further component K of the battery system BS. The further component K of the battery system BS may preferably be at least one further battery device. In addition, the battery system BS contains at least one operating device, which is designated by BTV and which is intended for operation of the battery system and/or of the at least one battery device BV. The at least one operating device BTV is arranged at least partially within the at least one further device V.

Figure 2A:
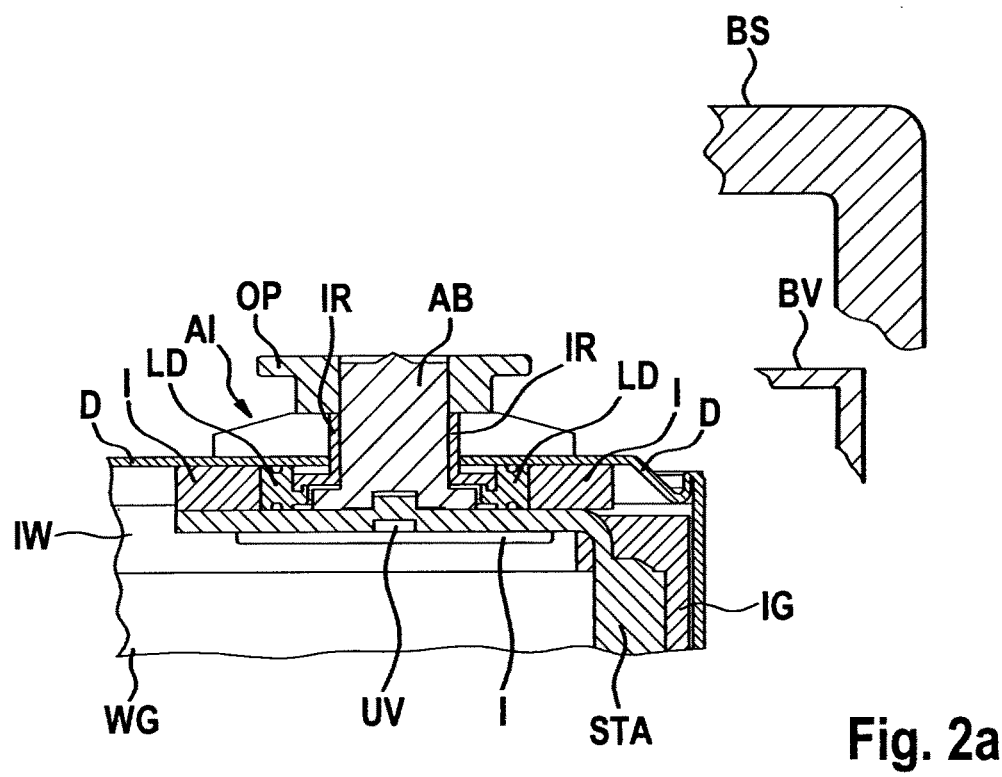
FIGS. 2a, 2b and 2c show a schematic illustration of the battery system according to the invention in accordance with a second, third and fourth embodiment.
Figure 2B:
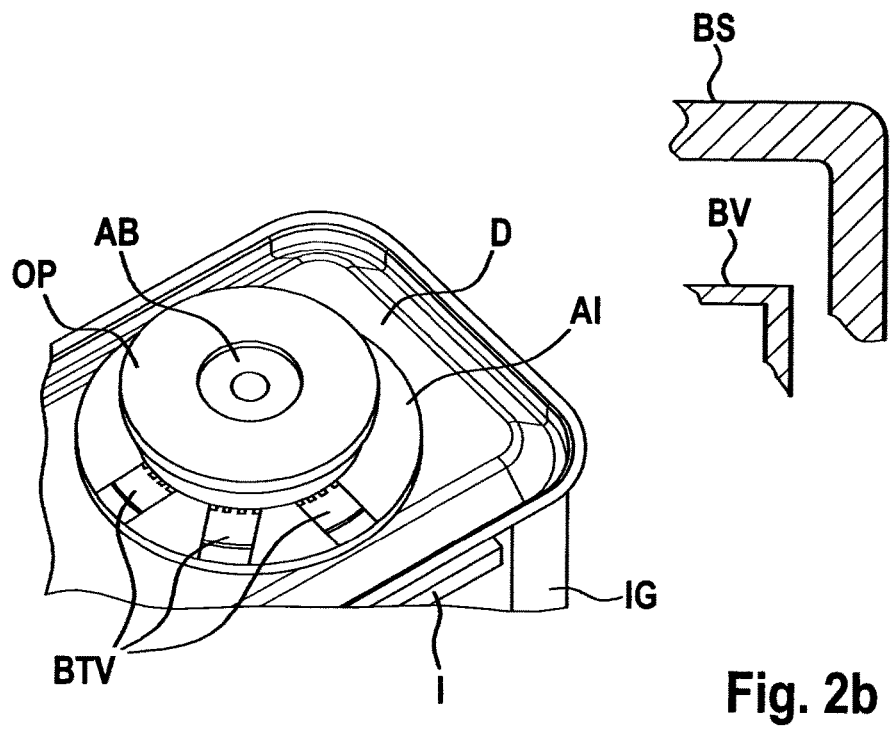
Figure 2C:
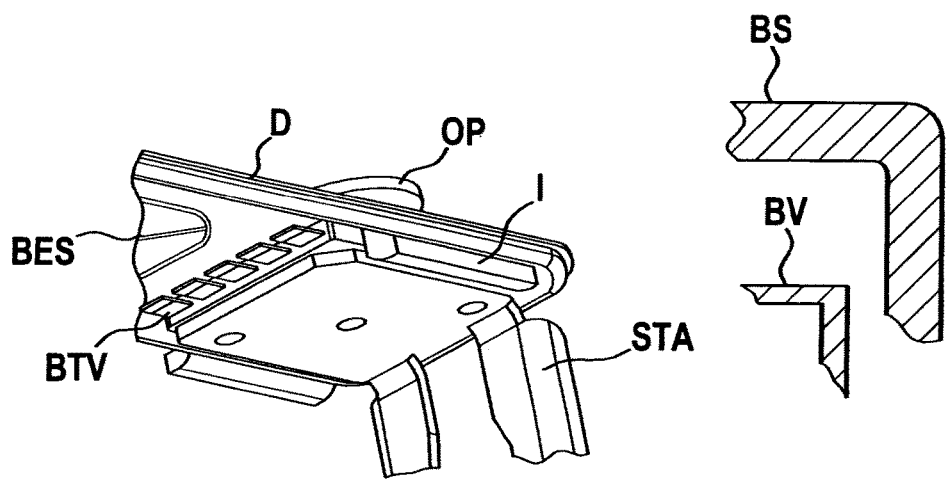

In FIGS. 2a, 2b and 2c the battery system according to the invention in accordance with a second, third and fourth embodiment is schematically illustrated. The battery system is designated in each case by BS.

In sub-FIG. 2a the battery system BS according to the invention in accordance with a second embodiment is schematically illustrated. The battery system BS contains at least one battery device BV. The at least one battery device BV may be, for example, a battery module or a battery cell. WG designates at least one winding group that has active layers, which for example are formed from graphite cobalt manganese layers and lithium cobalt manganese layers. STA designates at least one current collector. If the current collector STA acts as an anode, it is preferably formed from aluminum. If the current collector STA acts as a cathode, it is preferably formed from copper. AB designates at least one connecting bolt, which is suitable for producing electrical contact between a lead (not illustrated) and/or an external consumer (not illustrated) and the at least one current collector STA. The at least one connecting bolt AB is formed in particular from aluminum, for example EN AW-1050©, with a proportion of 99.5% aluminum. IR designates at least one insulating ring. The at least one insulating ring IR is suitable for preventing electrical contact between the at least one connecting bolt AB and a cover of the battery device BV designated by D. The at least one insulating ring IR is formed in particular from polybutylene terephthalate. LD designates at least one lip seal ring. The at least one lip seal ring LD is suitable for preventing substances from passing out from and/or into the battery device BV. The at least one lip seal ring LD is injected onto the at least one insulating ring and is formed in particular from an elastomer, for example from FKM-V8836©. I designates at least one insulator. The at least one insulator I is suitable for preventing electrical contact between the cover D and the at least one current collector STA. The at least one insulator I is formed, for example, from polypropylene. The at least one insulator I is suitable in particular for receiving operating devices; the operating devices are suitable for operating the battery system BS or the at least one battery device BV. AI designates at least one spacing insulator. The at least one spacing insulator AI is suitable for preventing electrical contact between the cover D and the at least one connecting bolt AB. The at least one spacing insulator AI is formed for example from polypropylene, for example from PP GF30©. The at least one spacing insulator AI is suitable in particular for receiving operating devices; the operating devices are suitable for operating the battery system BS or the at least one battery device BV. IG designates an insulating housing. The insulating housing serves to receive the at least one winding group WG and is formed in particular from polypropylene. OP designates an upper plate. The upper plate OP is formed in particular from aluminum, for example EN AW-1050A©, with a proportion of 99.5% aluminum. The upper plate OP forms a common electrical contact together with the connecting bolt AB. UV designates an ultrasonic welding point. The connecting bolt AB has been welded to the current collector STA at the ultrasonic welding point UV. IW designates an inner wall of the battery device BV.

In sub-FIG. 2b the battery system BS according to the invention in accordance with a third embodiment is schematically illustrated. BTV designates at least one operating device; the at least one operating device BTV is suitable for operating the battery system BS or the at least one battery device BV. The at least one operating device BTV is arranged at least partially within the spacing insulator AI.

In sub-FIG. 2c the battery system BS according to the invention in accordance with a fourth embodiment is schematically illustrated. BTV designates at least one operating device; the at least one operating device BTV is suitable for operating the battery system BS or the at least one battery device BV. The at least one operating device BTV is arranged at least partially within the insulator I. BES designates a rupture disk or rupture device of the at least one battery device BV, which rupture disk or rupture device BES is integrated in the cover D and is suitable for degassing the at least one battery device BV.

What is claimed is:

1. A battery system (BS), comprising at least one battery device (BV) and at least one operating device (BTV) for operation of at least one of the battery system (BS) and the at least one battery device (BV), and at least one further device (V), wherein the at least one device (V) includes an annular insulator (AI, I) positioned around a connecting bolt (AB) and is configured to create a physical distance between two component parts of the battery system (BS), and wherein the at least one operating device (BTV) is arranged at least partially within the at least one further device (V).

2. The battery system (BS) according to claim 1, characterized in that the at least one further device (V) includes a belt, or a press belt, or a housing of the at least one battery device (BV) or a stabilizing device, configured to provide mechanical stability for at least one of the following: the housing of the at least one battery device (BV); the battery device (BV); a battery cell; and a battery module.

3. The battery system (BS) according to claim 1, characterized in that the at least one further device (V) is formed from an electrically insulating material.

4. The battery system (BS) according to claim 1, characterized in that the at least one operating device (BTV) is at least one of the following: an electronic device; a control device; a sensor; and an actuator.

5. The battery system (BS) according to claim 1, characterized in that the at least one battery device (BV) is a battery module or a battery cell.

6. The battery system (BS) according to claim 1, characterized in that the annular insulator (AI) is a spacing insulator and the at least one operating device (BTV) is arranged at least partially in the spacing insulator (AI).

7. The battery system (BS) according to claim 1, wherein the at least one device (V) is configured to create a physical distance between the at least one battery device (BV) and a further component (K) of the battery system (BS).

8. The battery system (BS) according to claim 1, wherein the at least one device (V) is configured to create a physical distance between the at least one battery device (BV) and at least one other battery device.

9. The battery system (BS) according to claim 1, wherein the at least one device (V) is configured to create a physical distance between at least two component parts of the at least one battery device (BV).

10. The battery system (BS) according to claim 1, characterized in that the at least one further device (V) includes a cooling device or a fire protection device.

11. The battery system (BS) according to claim 1, characterized in that the at least one further device (V) is formed from plastic.

12. The battery system (BS) according to claim 1, characterized in that the operating device (BTV) is at least partly positioned in the annular insulator (AI).

13. A spacer (V) having at least one surface that corresponds to at least one correspondence surface of at least one battery device (BV) of a battery system (BS), wherein the battery system (BS) contains an operating device (BTV) configured for operating at least one of the battery system (BS) and the at least one battery device (BV), and the spacer (V) includes an annular insulator (AI, I) positioned around a connecting bolt (AB) and is configured to create a physical distance between two component parts of the battery system (BS), characterized in that the at least one operating device (BTV) is arranged at least partially within the spacer (V).

14. The spacer according to claim 13, characterized in that the spacer (V) is formed from an electrically insulating material.

15. The spacer according to claim 13, characterized in that the at least one operating device (BTV) is at least one of the following: an electronic device; a control device; a sensor; and an actuator.

16. The spacer according to claim 13, characterized in that the at least one battery device (BV) is a battery module or a battery cell.

17. A battery device (BV), characterized in that the battery device has a spacer (V) according to claim 13 and the battery device (BV) is a battery module or a battery cell.

18. The spacer according to claim 13, wherein the spacer (V) is configured to create a physical distance between the at least one battery device (BV) and a further component (K) of the battery system (BS).

19. The spacer according to claim 13, wherein the spacer (V) is configured to create a physical distance between the at least one battery device (BV) and at least one other battery device.

20. The spacer according to claim 13, wherein the spacer (V) is configured to create a physical distance between at least two component parts of the at least one battery device (BV).

* * * * *